Patented June 19, 1923.

1,459,395

UNITED STATES PATENT OFFICE.

TONI HAMBURGER, OF BERLIN-DAHLEM, GERMANY, ASSIGNOR TO CHEMISCHE FABRIK VORM. GOLDENBERG GEROMONT & CIE., OF WIESBADEN, GERMANY.

PROCESS OF PURIFYING LACTIC ACID.

No Drawing.     Application filed September 23, 1921. Serial No. 502,782.

*To all whom it may concern:*

Be it known that I, TONI HAMBURGER, a citizen of Germany, residing at 69 Thiel-Allee, in Berlin-Dahlem, Germany, have invented a new and useful Process of Purifying Lactic Acid, of which the following is a specification.

The purification of lactic acid for practical purposes is known to meet with great difficulties. This is particularly true of the purification of the lactic acid or of lactates obtained by the fermentation of raw materials containing sugars or starch, and the purification of which is the more difficult on account of impurities resulting from the raw material itself or produced therefrom by accessory fermentations. Then, the separation of lactic acid from the almost always present volatile acids, and from butyric acid in particular, is exceedingly difficult.

In accordance with my invention, about to be described, the purification of lactic acid or of its solutions, and of solutions of lactates may be advantageously accomplished by first converting lactic acid or the lactates into magnesium lactate which may then be purified, if necessary, the magnesium salt being thereupon decomposed by a suitable acid, and the resulting free lactic acid being then recovered by a suitable solvent at a moderate temperature, that is, at the ordinary or at an increased temperature. The conversion of solutions of crude lactic acid into magnesium lactate may be effected by heating the solutions with a suitable magnesium compound, such as magnesium carbonate, magnesium-hydroxid, or magnesium oxid, generally called magnesia usta.

I may for instance proceed by effecting the lactic acid fermentation in the presence of magnesium compounds instead of the lime generally employed heretofore for the neutralization of the excess of acid which would otherwise interfere with the progress of the fermentation. In view of its restricted solubility, magnesium lactate may be easily washed without appreciable losses. In connection therewith it has been ascertained as a point of importance that the solubility of magnesium lactate is not increased by the impurities present, as distinguished from the behavior of the corresponding calcium salt.

I may also proceed by producing the magnesium lactate by decomposition of the more easily soluble calcium lactate or of any other soluble lactate by means of suitable magnesium salts, such as for instance by precipitation with magnesium sulphate. It has been found that any remaining fractions of magnesium sulphate do not interfere with the further treatment of the lactate.

The concentrated solution of magnesium lactate obtained by these methods is acidified with anhydrous sulphuric acid, and the lactic acid is then obtained in the usual manner by extraction with a suitable solvent, such as acetone, ether or the like adapted to dissolve the lactic acid.

Then, I may also proceed by making a suspension of the magnesium lactate in acetone, ether or the like, the calculated amount of sulphuric acid or a slightly less amount being then added, and the mixture being then agitated or shaken until thoroughly exhausted. This causes the magnesium sulphate to be precipitated so as to admit of easy filtration, whereby the still remaining lactic acid may also be easily extracted by washing with the solvent. Only the lactic acid is taken up by the ether, while magnesium sulphate or magnesium lactate, and any still adhering impurities remain undissolved. By the extraction of lactic acid in the cold the decomposition of the lactic acid and the formation of lactic-acid-anhydride is avoided, so that upon evaporation only pure lactic acid remains. Any slight impurities still existing in the solvents may be removed, if necessary, by treating the product once with bone black.

*Example I.*—40 pounds commercial lactic acid are diluted with a suitable amount of water, and are treated with an amount of burnt magnesia slightly in excess of the calculated quantity, and are heated until solution is effected; the dark solution is partly decolorized by treatment with bone black. After evaporation of the solution magnesium lactate of great purity will crystallize out. If necessary it may be re-crystallized once so as to obtain absolutely pure lactic acid. The concentrated solution of magnesium lactate is decomposed with acid, is extracted with ether and, if necessary, may be treated again with bone black. After evaporation or after removing the solvent by distillation pure lactic acid remains.

*Example II.*—188 pounds of the magnesium lactate obtained as specified in the preceding example are caused to be held in suspension in about 290 quarts of ether (or 94 kilogrammes of magnesium lactate in 280 liters of ether), and are treated with about 21 quarts concentrated anhydrous sulphuric acid (or with 20 liters of said acid); the acid containing 3.43 kilogrammes $H_2SO_4$ in twenty liters). After prolonged agitation or shaking, the magnesium sulfate separates out, and can be easily filtered. The solution is decanted or filtered, and the magnesium sulphate is desiccated by suction and is washed with ether. After the solvent has been distilled off, pure lactic acid remains.

*Example III.*—40 pounds commercial lactic acid are diluted with a suitable quantity of water, and mixed with an amount of burnt magnesia slightly in excess of the calculated quantity. After heating to boiling the resulting solution is decolorized with bone black. The lactate crystallizes after evaporation, and is washed with a suitable quantity of a dilute solution of magnesium lactate or of magnesium sulphate or magnesium chlorid, and it is then treated as specified in Examples I or II for the production of pure lactic acid.

By means of this purification of the magnesium lactate the impurities are removed without appreciably large losses of magnesium lactate.

I claim:—

1. The process of purifying lactic acid which consists in converting impure lactic acid-products into magnesium lactate, decomposing said lactate with acid, extracting the resulting lactic acid with a solvent, and removing said solvent.

2. The process of purifying lactic acid which consists in converting impure lactic-acid-products into magnesium lactate, purifying said lactate, adding acid to the purified lactate, and thereby decomposing the same, extracting the resulting free lactic acid with a solvent at moderate temperature, removing the solvent by distillation.

3. The process of producing pure lactic acid and of purifying impure lactic acid which consists in treating a lactate of greater solubility than magnesium-lactate, with a suitable magnesium salt, thereby producing magnesium lactate, decomposing said magnesium lactate, and extracting and purifying the resulting lactic acid.

4. The process of producing pure lactic acid which consists in acidifying a concentrated solution of magnesium-lactate with sulphuric acid, adding a volatile solvent to the acidified mixture, separating the resulting extract of lactic acid from the mixture, and removing the solvent by distillation.

5. The process of producing pure lactic acid and of purifying impure lactic acid which consists in adding solid magnesium lactate to a volatile solvent of lactic acid, suspending said lactate in the solvent, adding approximately the required quantity of anhydrous sulphuric acid to the solvent mixture, agitating said mixture, and separating the resulting solution of lactic acid from the insoluble magnesium salt, and removing the solvent from the lactic acid solution.

6. The process of producing pure lactic acid, which consists in decomposing magnesium lactate, thereby forming lactic acid, adding a volatile solvent, thereby producing a solution of lactic acid in said solvent, separating the solution of lactic acid from the remaining precipitate, and removing said solvent by distillation.

7. The process of producing pure lactic acid, and of purifying impure lactic acid which consists in converting impure lactic acid into magnesium lactate, washing said magnesium lactate with a dilute solution of a magnesium salt, then decomposing the washed lactate and separating the resulting lactic acid.

8. The process of producing pure lactic acid which consists in treating substances adapted for lactic-acid fermentation, so as to produce fermentation, generating lactic acid thereby, neutralizing the excess of lactic acid which is injurious to fermentation, with a suitable magnesium salt, thereby forming magnesium lactate, decomposing said magnesium lactate, separating the resulting lactic acid, dissolving said lactic acid in a solvent, and removing said solvent.

9. The method of purifying lactic compounds, which consists in converting the crude lactic compound into magnesium lactate, and obtaining lactic acid from such lactate by two successive treatments, one with an agent which will decompose such lactate, and the other with a solvent of lactic acid.

10. The method of obtaining pure lactic acid, which consists in subjecting magnesium lactate to two successive treatments, one of which employs an agent which will decompose such lactate, and the other a solvent of lactic acid.

In testimony whereof I have hereunto set my hand.

TONI HAMBURGER.